(12) United States Patent
Shea

(10) Patent No.: US 7,100,967 B2
(45) Date of Patent: Sep. 5, 2006

(54) RECREATIONAL VEHICLE HAVING SLIDE-OUT ATRIUM ROOM

(76) Inventor: Brian J. Shea, 12640 Dragoon Trail, Mishawaka, IN (US) 46544

( * ) Notice: Subject to any disclaimer, the term of this patent is extended or adjusted under 35 U.S.C. 154(b) by 0 days.

(21) Appl. No.: 10/366,942

(22) Filed: Feb. 14, 2003

(65) Prior Publication Data

US 2004/0160074 A1 Aug. 19, 2004

(51) Int. Cl.
*B60R 15/00* (2006.01)

(52) U.S. Cl. .................. 296/175; 296/165; 296/171
(58) Field of Classification Search .............. 296/175, 296/26.13, 171, 165, 26.01, 26.14, 26.09, 296/26.12, 176, 163, 172; 52/67
See application file for complete search history.

(56) References Cited

U.S. PATENT DOCUMENTS

| | | | |
|---|---|---|---|
| 2,384,659 A | 9/1945 | Wait | |
| 2,692,161 A | 10/1954 | Van Tassel | |
| 2,913,775 A | 11/1959 | Sailor | |
| 2,965,412 A | 12/1960 | Henderson et al. | |
| 3,257,760 A * | 6/1966 | Calthorpe | 296/165 |
| 3,360,891 A | 1/1968 | Gardner | |
| 3,381,421 A * | 5/1968 | Sicklesteel | 296/174 |
| 3,941,414 A | 3/1976 | Platt | |
| 4,049,310 A | 9/1977 | Yoder | |
| 4,133,571 A | 1/1979 | Fillios | |
| 4,253,283 A | 3/1981 | May | |
| 4,261,613 A * | 4/1981 | Alford | 296/172 |
| 4,463,982 A | 8/1984 | Irelan | |
| 4,652,041 A | 3/1987 | Barber et al. | |
| 4,930,837 A | 6/1990 | Marsh et al. | |
| 4,944,550 A * | 7/1990 | Drown et al. | 296/175 |
| 5,011,216 A * | 4/1991 | Baughman | 296/175 |
| 5,050,927 A | 9/1991 | Montanari | |
| 5,061,006 A * | 10/1991 | Baughman | 296/176 |
| 5,066,065 A | 11/1991 | Baughman | |
| 5,154,469 A | 10/1992 | Morrow | |
| 5,203,603 A * | 4/1993 | Hertzberg et al. | 296/165 |
| 5,237,782 A | 8/1993 | Cooper | |
| 5,248,180 A | 9/1993 | Hussaini | |
| 5,628,541 A | 5/1997 | Gardner | |
| 5,634,683 A | 6/1997 | Young | |
| 5,706,612 A * | 1/1998 | Tillett | 296/171 |
| 5,785,373 A * | 7/1998 | Futrell et al. | 296/175 |
| 5,800,002 A | 9/1998 | Tiedge | |
| 5,860,686 A | 1/1999 | Tiedge | |
| 5,921,614 A * | 7/1999 | Biedermann et al. | 296/165 |
| 5,984,396 A | 11/1999 | Schneider | |
| 6,007,142 A | 12/1999 | Gehman et al. | |
| 6,048,016 A * | 4/2000 | Futrell et al. | 296/165 |
| 6,135,539 A | 10/2000 | Bailey et al. | |
| 6,152,520 A | 11/2000 | Gardner | |
| 6,224,126 B1 | 5/2001 | Martin et al. | |
| 6,234,566 B1 | 5/2001 | Cyr et al. | |
| 6,254,171 B1 | 7/2001 | Young | |
| 6,257,638 B1 | 7/2001 | Graber | |
| 6,286,883 B1 | 9/2001 | Schneider et al. | |
| 6,290,284 B1 | 9/2001 | Crean | |
| 6,293,612 B1 | 9/2001 | Crean | |
| 6,302,475 B1 | 10/2001 | Anderson | |
| 6,325,437 B1 | 12/2001 | Hiebert et al. | |
| 6,354,646 B1 | 3/2002 | McManus et al. | |
| 6,428,073 B1 | 8/2002 | Blodgett et al. | |
| 2001/0030437 A1 * | 10/2001 | Hiebert et al. | 296/26.01 |
| 2002/0074816 A1 | 6/2002 | McManus et al. | |
| 2002/0089213 A1 * | 7/2002 | Gehman et al. | 296/171 |

\* cited by examiner

*Primary Examiner*—Kiran Patel
(74) *Attorney, Agent, or Firm*—Botkin & Hall, LLP

(57) ABSTRACT

A recreational vehicle comprises a slide-out room. A ceiling of the slide-out room comprises at least one window to allow external light into the slide-out room.

5 Claims, 6 Drawing Sheets

US 7,100,967 B2

RECREATIONAL VEHICLE HAVING SLIDE-OUT ATRIUM ROOM

BACKGROUND OF THE INVENTION

This disclosure relates to recreational vehicles. More particularly, it relates to recreational vehicles having one or more slide-out rooms.

Some recreational vehicles have a slide-out room. A slide-out room may be retracted into the recreational vehicle or extended from the recreational vehicle. The slide-out room may be retracted during, for example, transport of the recreational vehicle or parking of the recreational vehicle in a relatively small space. The slide-out room may be extended to increase the living space in the recreational vehicle.

SUMMARY OF THE INVENTION

According to this disclosure, a recreational vehicle comprises a slide-out room. A ceiling of the slide-out room comprises at least one window to allow external light into the slide-out room.

The slide-out room is coupled to a main vehicle portion of the recreational vehicle for movement relative to the main vehicle portion between extended and retracted positions. In the extended position, the at least one window of the ceiling is positioned outside the main vehicle portion. In the retracted position, the at least one window of the ceiling is positioned inside the main vehicle portion.

In an illustrative embodiment, each of the ceiling and a vertical wall of the slide-out room comprises a plurality of windows to allow external light into the slide-out room. Also in the illustrative embodiment, each window of the ceiling is aligned with an associated window of the vertical wall and the windows of the ceiling provide a majority of the surface area of the ceiling. Thus, the slide-out room in this embodiment may serve as an atrium or sunroom of the recreational vehicle when in the extended position.

Additional features and advantages of the present invention will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
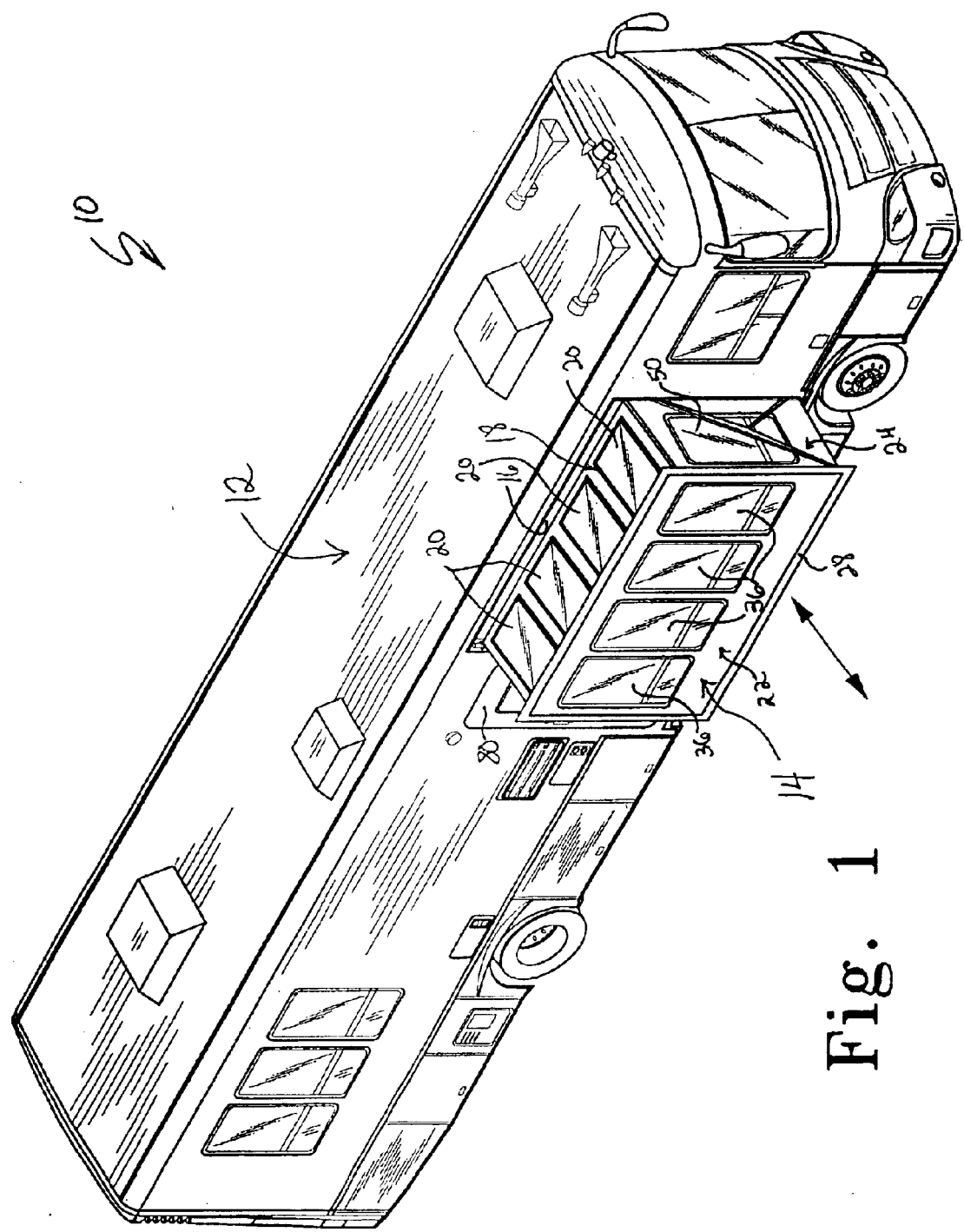
FIG. 1 is a perspective view showing a recreational vehicle having a slide-out room that is movable to an extended position in which a plurality of windows of a ceiling of the slide-out room are positioned outside a main vehicle portion of the recreational vehicle to allow external light into the slide-out room.
Figure 2:
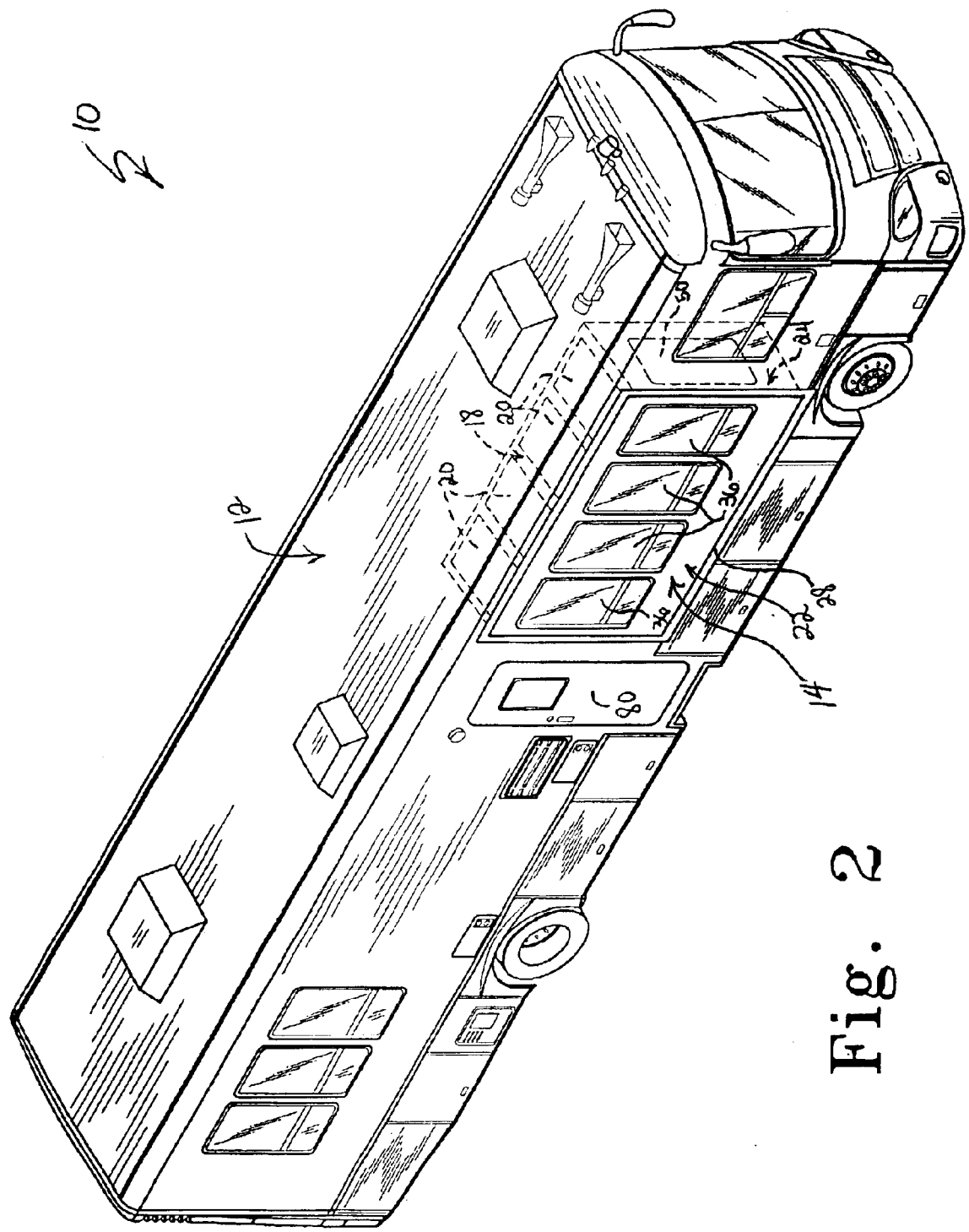
FIG. 2 is a perspective view showing the recreational vehicle with the slide-out room in a retracted position in which the windows of the ceiling (shown in phantom) are positioned inside the main vehicle portion.
Figure 3:
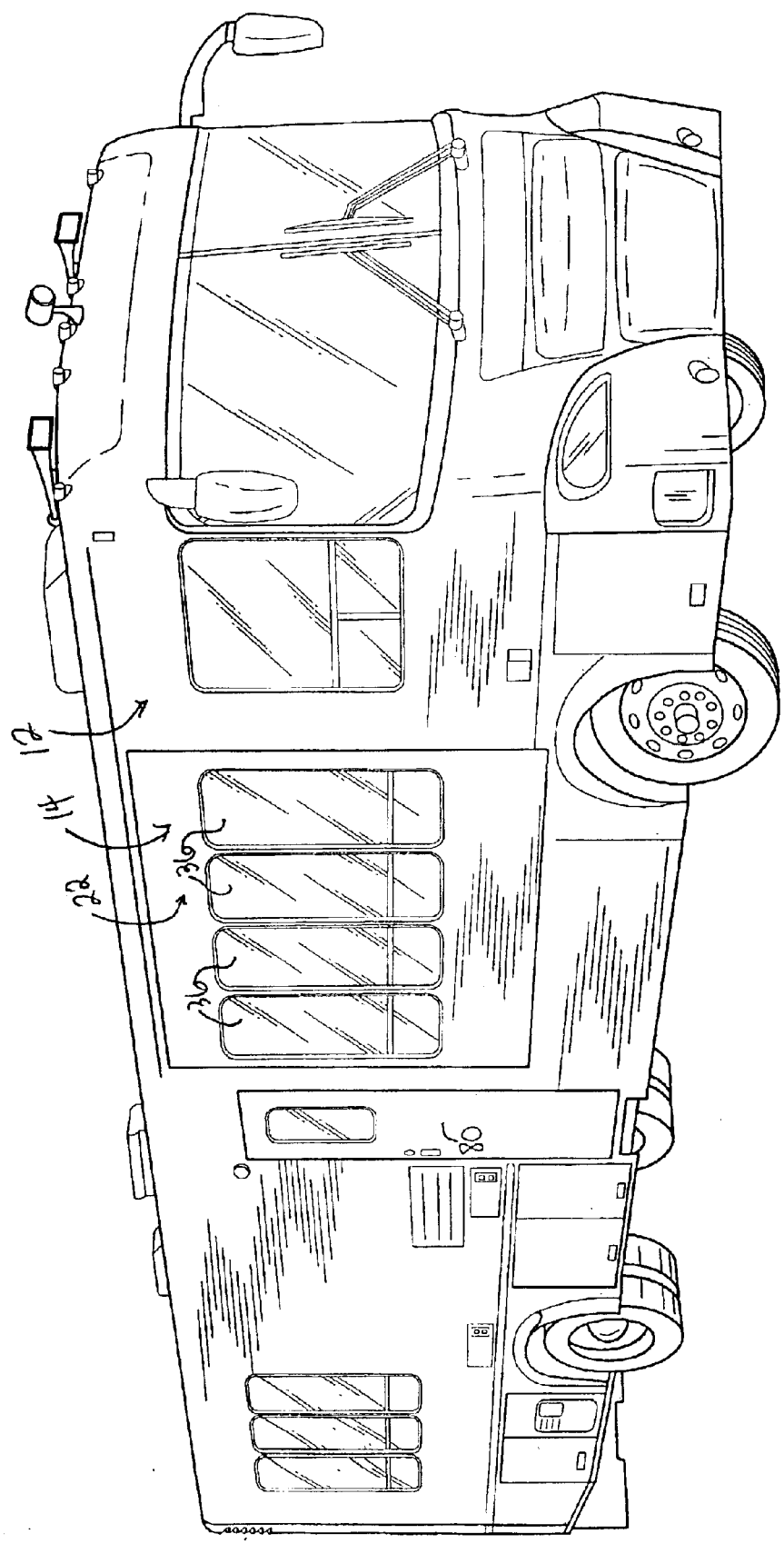
FIG. 3 is another perspective view showing the recreational vehicle with its slide-out room in the retracted position.

A recreational vehicle 10 in accordance with this disclosure comprises a main vehicle portion 12 and a slide-out room 14 as shown in FIGS. 1–3. The main vehicle portion 12 has a room-receiving aperture 16, as shown in FIG. 1. The slide-out room 14 is coupled to the main vehicle portion 12 for movement of the slide-out room 14 through the room-receiving aperture 16 of the main vehicle portion 12 between an extended position, as shown in FIG. 1, to expand a living area 62 (see FIG. 7) of the recreational vehicle 10, and a retracted position, as shown in FIGS. 2 and 3. All types of mechanisms for moving slide-out room 14 relative to main vehicle portion 12 are contemplated by this disclosure. For example, such mechanisms may include hydraulic actuators or electromechanical actuators that act directly on room 14 or that act through various linkage assemblies to move slide-out room 14 relative to main vehicle portion 12. In addition, various guide assemblies, such as track and roller arrangements, linear bearings arrangements, telescoping guide columns, or the like may be provided to support and guide slide-out room 14 during movement.

In accordance with this disclosure, ceiling 18 of the slide-out room 14 has at least one window 20. Illustratively, ceiling 18 comprises a four windows 20, as shown in FIGS. 1, 2, 4, and 6, to allow external light (e.g., sunlight) into the slide-out room 14. It is contemplated by this disclosure that ceiling 18 of slide-out room may have any number of windows. When the slide-out room 14 is positioned in the extended position, the windows 20 are positioned outside the main vehicle portion 12 so that the slide-out room 14 serves as a sunroom or atrium of vehicle 10. When the slide-out room 14 is positioned in the retracted position, the windows 20 are positioned inside the main vehicle portion 12, as shown in FIG. 2. In the illustrative embodiment, the slide-out room 14 is part of a motorhome type of recreational vehicle. The slide-out room 14 disclosed herein may also be used with other types of recreational vehicles such as towable trailers and fifth-wheels, campers, vans, and cruisers.

Figure 5:
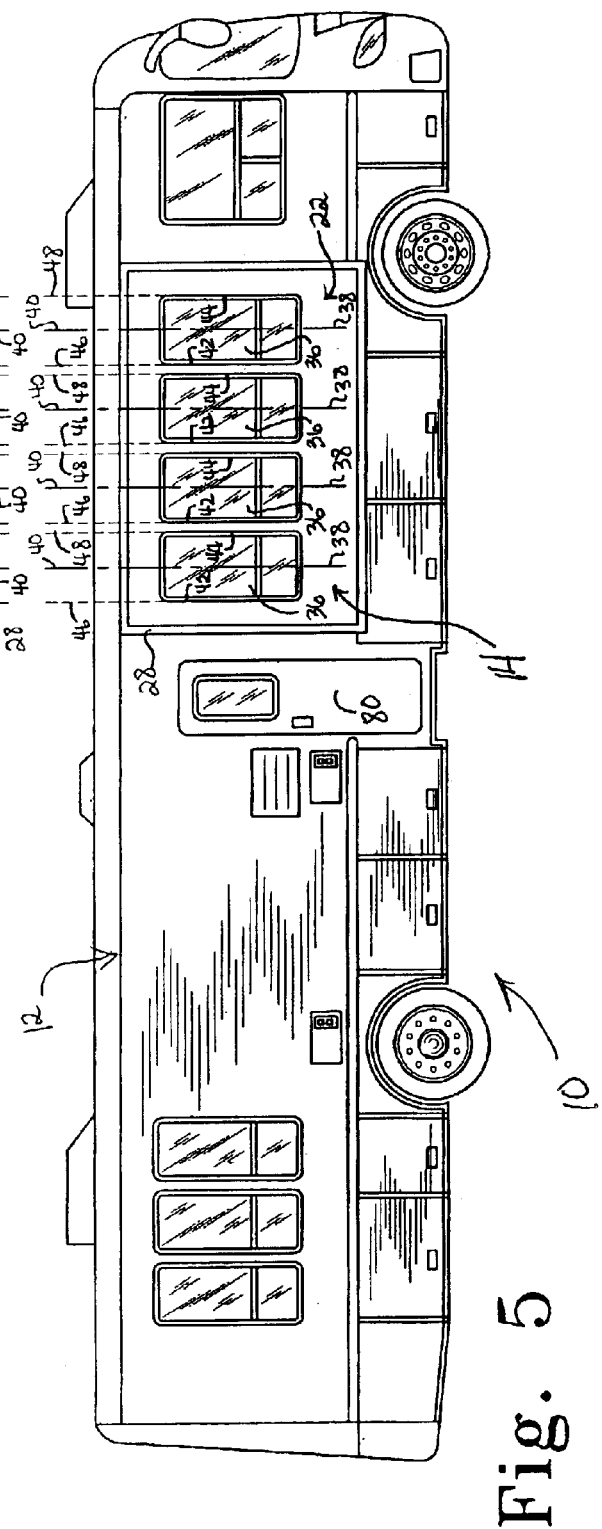
Figure 6:
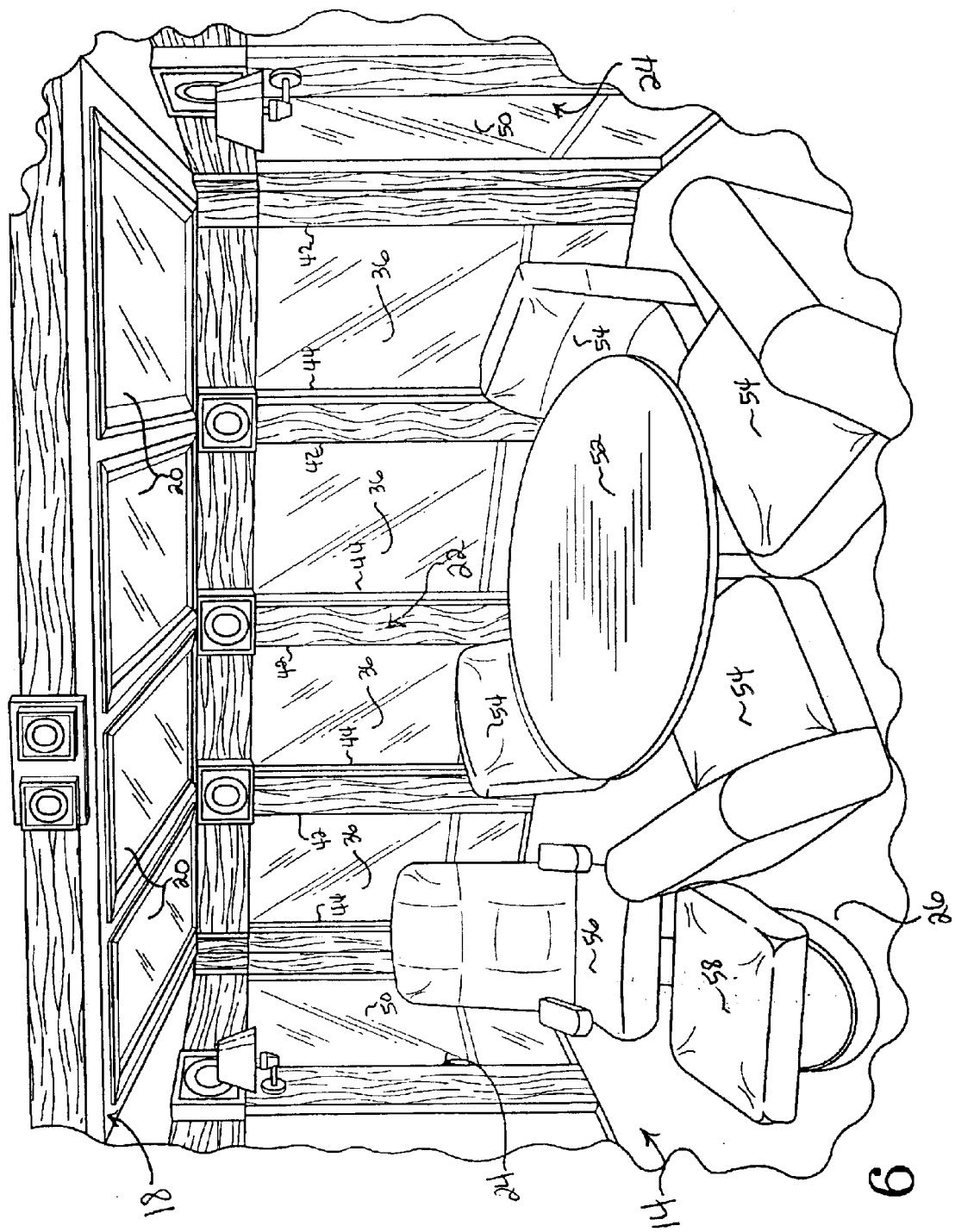
FIG. 6 is a perspective view showing the interior of the slide-out room.
Figure 7:
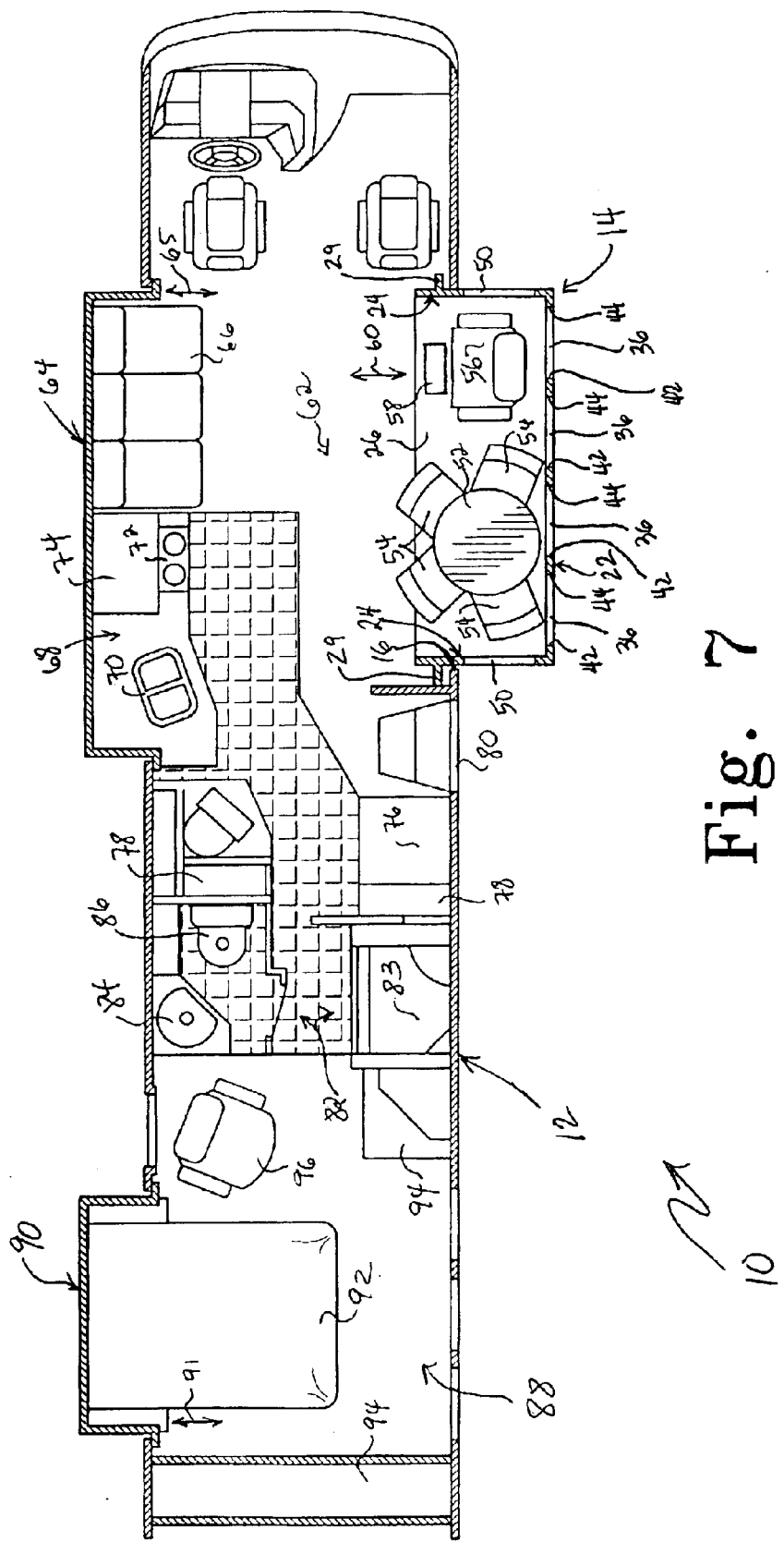
FIG. 7 is a top view of a floor plan of the recreational vehicle showing the recreational vehicle comprising, for example, three slide-out rooms.

The slide-out room 14 comprises the ceiling 18, an outer wall 22 (see FIGS. 1–3 and 5–7), a pair of side walls 24 (see FIGS. 1, 2, 4, 6, and 7), and a floor 26 (see FIGS. 6 and 7). Illustrative wall 22 is vertical and extends parallel with respect to the long dimension of vehicle 10. Illustrative walls 24 are vertical and extend perpendicular to the long dimension of vehicle 10. In addition, illustrative walls 24 are parallel to and spaced apart from one another. Furthermore, illustrative walls 22, 24 are each generally flat or planar. In alternative embodiments, one or more of walls 22, 24, or portions thereof, may be inclined with respect to vertical, may have some curvature in lieu of being flat, or may have a stepped configuration. Thus, slide-out rooms 14 of all shapes are contemplated herein.

The ceiling 18 and floor 26 are coupled to top and bottom portions, respectively, of the walls 22, 24 so that the ceiling 18, walls 22, 24, and floor 26 move together as a unit between the extended and retracted positions. The second walls 24 extend from the first wall 22 toward the main vehicle portion 12 when the slide-out room 14 is positioned in the extended position. A peripheral flange 28 surrounds the first wall 22 to cover any gap that exists between the boundary of aperture 16 and each of ceiling 18, walls 24, and floor 26 when the slide-out room 14 is positioned in the retracted position. In some embodiments, slide-out room includes an internal flange 29 (see FIG. 7) that covers any gap existing between the boundary of aperture 16 and each of ceiling 18, walls 24, and floor 26 when slide-out room 14 is positioned in the extended position. One or more suitable sealing members or gaskets, such as those made from rubber or foam rubber, may be provided at the interface between main vehicle portion 12 and either or both of flanges 28, 29.

Figure 4:
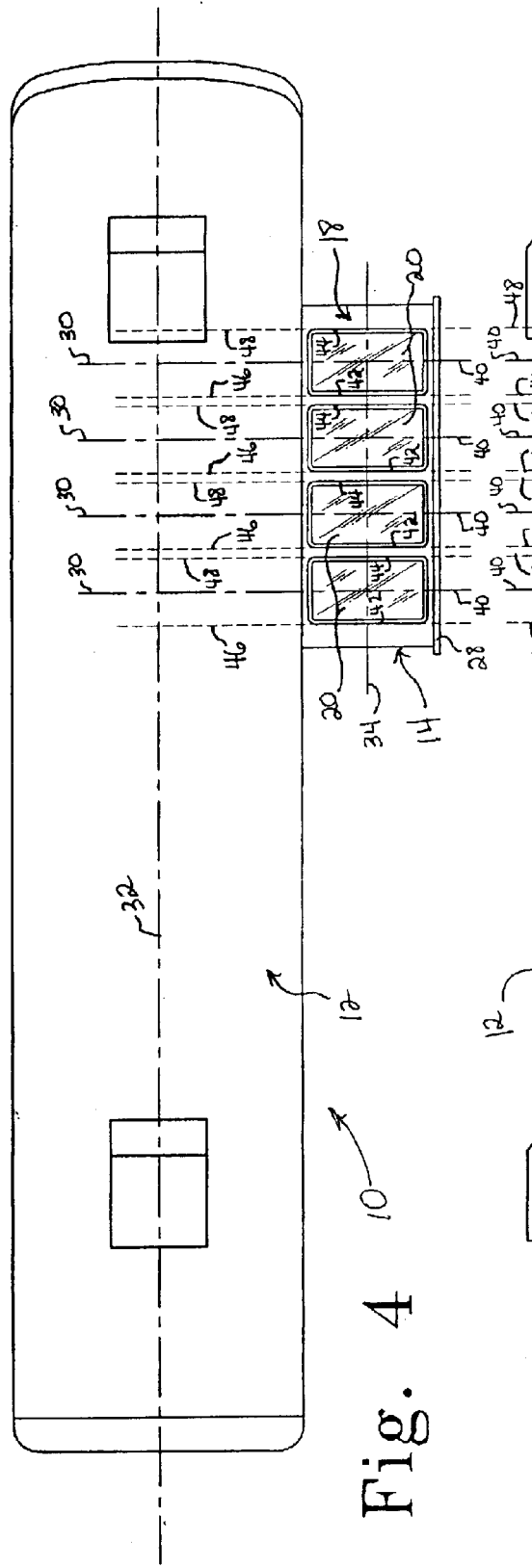
FIGS. 4 and 5 are top plan and side elevation views, respectively, showing the slide-out room in the extended position, FIGS. 4 and 5 being arranged on the same page in a manner to show that each window of the ceiling of the slide-out room (see FIG. 4) is aligned with an associated window of a vertical wall of the slide-out room (see FIG. 5)

In the illustrative embodiment, windows 20 of ceiling 18 provide a majority of the surface area of ceiling 18, as shown in FIG. 4. Optionally, the windows 20 may provide less than a majority of the surface area of the ceiling 18. The windows 20 may be permanently closed or may be openable by known mechanisms (e.g., sliding mechanisms, pivot mechanisms, hand crank mechanisms). In alternative embodiments, the four illustrative windows 20 may be replaced by a single, large window that provides a majority of the surface area of ceiling 18. Illustrative windows 20 are rectangular and have central longitudinal axes 30 that are parallel to one another and perpendicular to a central longitudinal axis 32 of the main vehicle portion 12 as shown in FIG. 4. Illustrative ceiling 18 is also rectangular and has a central longitudinal axis 34 that is perpendicular to the central longitudinal axes 30 of the windows 20 as also shown in FIG. 4.

The ceiling 18 and its windows 20 are inclined slightly from horizontal, as suggested in FIGS. 1, 2, and 6. In particular, the ceiling 18 and its windows 20 are inclined somewhat upwardly as they extend laterally inwardly from the top portion of the first wall 22. Such an inclination promotes run-off of water on the ceiling 18. Optionally, the ceiling 18 and its windows 20 may be configured without any inclination or, alternatively, some or all of ceiling 18 may be inclined in a different direction. In addition, ceiling 18 may have a domed or crowned configuration in lieu of the illustrative planar configuration. In such embodiments, windows 20 may have suitable contours to match the dome or crown of ceiling 18.

The first wall 22 comprises at least one window 36 to allow external light into the slide-out room 14, as shown in FIGS. 1–3 and 5–7. In the illustrative embodiment, wall 36 has four windows 36 to match the number of windows 20 on ceiling 18. The windows 36 may be permanently closed or may be openable by known mechanisms (e.g., sliding mechanisms, pivot mechanisms, hand crank mechanisms). Illustrative windows 36 are rectangular and have central longitudinal axes 38 that are parallel to one another as shown in FIG. 5.

In the illustrative embodiments, each window 20 of the plurality of windows 20 of the ceiling 18 is aligned with an associated window 36 of the plurality of windows 36 of the first wall 22, as shown in FIGS. 4 and 5. The central longitudinal axes 30, 38 of the associated windows 20, 36, respectively, are positioned on and define a set of vertical imaginary planes 40. The imaginary planes 40 are parallel to one another and perpendicular to the central longitudinal axis 32 of the recreational vehicle 10.

Each of illustrative windows 20, 36 has a first side edge 42 and a second side edge 44, as shown in FIGS. 4 and 5. The first side edges 42 of the associated windows 20, 36 are positioned on and define a set of vertical imaginary planes 46. Similarly, the second side edges 44 of the associated windows 20, 36 are positioned on and define a set of vertical imaginary planes 48. The imaginary planes 46, 48 are parallel to one another and to the imaginary planes 40 and are perpendicular to the central longitudinal axis 32 of the recreational vehicle 10. As such, the width (i.e., the perpendicular distance between the first and second side edges 42, 44) of the windows 20, 36 is the same which contributes to the sunroom effect of slide-out room 14 as shown best in FIG. 6. Optionally, the windows 20 have one width and the windows 36 have another width different from the width of the windows 20. Further optionally, some of windows 20 may have widths different that the width of others of windows 20 and some of windows 36 may have widths different than the width of others of windows 36.

Each of the ceiling 18 and the first wall 22 may optionally have a number of windows 20, 36 different from four. For example, one or both of the ceiling 18 and the first wall 22 may have only one window 20, 36, respectively, that is larger or smaller than suggested in the Figures. The ceiling 18 and first wall 22 may have the same number of windows 20, 36 or a different number of windows 20, 36. The first wall 22 may have no window 36.

Each of the second walls 24 comprises a window 50 to allow external light into the slide-out room 14. The windows 20 may be permanently closed or may be openable by known mechanisms (e.g., sliding mechanism, pivot mechanism, hand crank mechanism). Illustrative windows 50 are rectangular and are the same size as windows 20, 36.

Optionally, some or all of the windows 20, 36, 50 may have a non-rectangular shape. For example, one or more of the windows 20, 36, 50 may be circular, oval, elliptical, triangular, square, pentagonal, or any other desired shape. In addition, some or all of windows 20, 36, 50 may be concave or convex in lieu of the illustrative generally planar configuration. In some embodiments, windows 20, 36, 50 are made of any suitable transparent material, such as glass or acrylic. In other embodiments, some or all of the windows 20, 36, 50 may be made of semi-transparent or translucent material that diffuses external light as it passes therethrough into the slide-out room 14. Optionally, some or all of windows 20, 36, 50 may be tinted or mirrored.

One example of the interior of the slide-out room 14 is shown in FIGS. 6 and 7. The slide-out room 14 may have various pieces of furniture placed or mounted therein. Illustratively, a table 52, a number (e.g., four) of chairs 54 surrounding the table 52, and a stand-alone chair 56 and associated footrest 58 is provided in room 14. The table 52, chairs 54, stand-alone chair 56, and footrest 58 are coupled to the floor 26 for movement therewith between the extended and retracted positions, as indicated by the double-headed arrow 60 shown in FIG. 7.

The recreational vehicle 10 comprises a second slide-out room 64 coupled to the main vehicle portion 12 for movement relative thereto between extended and retracted positions, as indicated by the double-headed arrow 65 shown in FIG. 7. The slide-out rooms 14 and 64 are associated with a common living area 62 for expansion of the size thereof. Providing the windows 20 in the ceiling 18 of the slide-out room 14 facilitates light entering the living area 62 when slide-out room 14 is extended. Slide-out room 64 may or may not also have windows in its ceiling.

The second slide-out room 64 may also have various pieces of furniture placed or mounted therein. Illustratively, a sofa 66 and a kitchenette 68 are mounted to room 64. The kitchenette 68 comprises, for example, a sink 70, a stove 72, and microwave 74. A rearward portion of the illustrative living area 62 comprises a refrigerator 76 and pantries 78 on either side of the recreational vehicle 10, as shown in FIG. 7. A side access door 80 allows entry into and exit from the recreational vehicle 10.

A personal care area 82 is positioned rearwardly from the living area 62, as shown in FIG. 7. On one side of the recreational vehicle 10, the personal care area 82 comprises a bath tub or shower 83. On the other side of the recreational vehicle 10, the personal care area 82 comprises a restroom including a sink 84 and a toilet 86.

A bedroom 88 is positioned rearwardly from the personal care area 82, as shown in FIG. 7. The bedroom 88 comprises a third slide-out room 90 coupled to the main vehicle portion 12 for movement relative thereto between extended and retracted positions, as indicated by double-head arrow 91. When in the extended position, the third slide-out room 90 expands the size of the bedroom 88. The third slide-out room 90 is configured to receive one end of a bed 92 to increase the amount of walking space adjacent the other end of the bed 92. The bedroom 88 further comprises, for example, wardrobes 94 for clothing storage and a chair 96. Slide-out room 90 may or may not have windows in its ceiling.

Although the invention has been described in detail with reference to a certain illustrative embodiment, variations and modifications exist with the scope and spirit of this disclosure as described and defined in the following claims.

What is claimed is:

1. A recreational vehicle comprising a main vehicle portion and a slide-out room coupled to the main vehicle portion for movement relative thereto between an extended position exterior of the main vehicle portion and a retracted position interior of the main vehicle portion; said slide-out room including a rigid shape-retaining ceiling, a rigid shape-retaining floor, spaced upright rigid shape-retaining sidewalls extending between said ceiling and floor, and an upright rigid shape-retaining end wall extending between said side walls and extending between said ceiling and said floor in both said extended and retracted positions of the slide-out room; at least one window in said ceiling; each said window located interiorly within said main vehicle portion when the slide-out room is in its retracted position and located exteriorly of the main body portion when the slide-out room is in its extended position.

2. The recreational vehicle of claim 1 wherein said window covers a majority of the surface area of said ceiling.

3. The recreational vehicle of claim 1 and a plurality of windows in said ceiling, said windows covering a majority of the surface area of said ceiling.

4. The recreational vehicle of claim 3 wherein four of said windows are located in said ceiling.

5. The recreational vehicle of claim 1 and at least one window located in said end wall.

* * * * *